Figure 1:
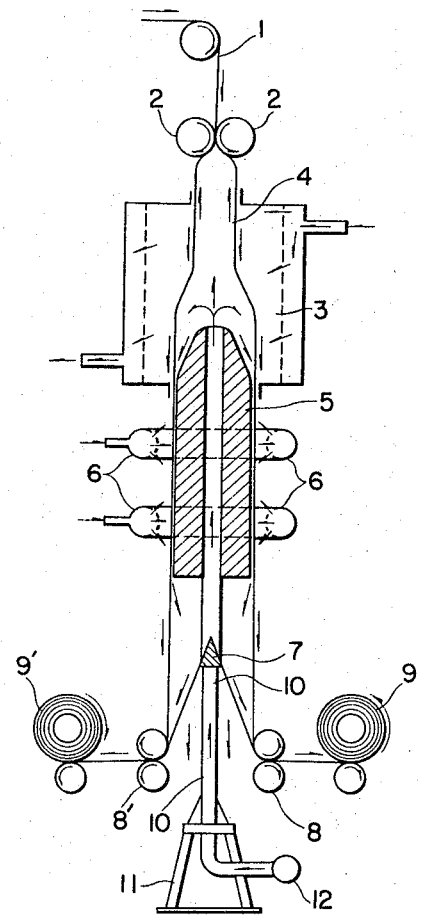

INVENTOR.
MASAHIDE YAZAWA

United States Patent Office 3,313,870
Patented Apr. 11, 1967

3,313,870
PROCESS AND APPARATUS FOR TWO-DIMENSIONAL STRETCHING OF THERMOPLASTIC FILM, PLATE AND PIPE
Masahide Yazawa, 102 Higashi-ku, Kunitachi-cho, Kitatama-gun, Tokyo, Japan
Filed May 2, 1963, Ser. No. 277,629
Claims priority, application Japan, May 8, 1962, 37/17,843
8 Claims. (Cl. 264—95)

This invention relates to a process and apparatus for two-dimensional stretching of thermoplastic film, plate and pipe.

In conventional extrusion molding of thick-walled cylindrical articles made of thermoplastic polymers, the polymer solution is extruded through a circular metal orifice and made directly into a molded cylinder or pipe. In the molding of a thin-walled article, the solution extruded is expanded into an article of larger diameter by inflating or blowing. However, in these extrusion processes the polymer extruded from an orifice is in a liquid state macromolecularly against the molding speed in the same way as in the spinning of a spinning solution of artificial fiber thread, so that the molecular folding is not sufficiently stretched and sufficient improvement in either the longitudinal or transverse molecular orientation cannot be effected. Accordingly, since articles molded of non-plasticized polymer are hard and brittle and, also, are inferior in tensile strength and elongation, a plasticizer is often added to the polymer. However, when the polymer is mixed with plasticizer, the heat resistance and dimensional stability of molded articles are yet low and, further, the mechanical properties are weak.

In the case of synthetic fiber, the polymer solution is extruded and coagulated to form a coagulated and non-stretched thread and, thereafter, a remarkable improvement in tensile strength, elongation and physical properties is effected by cold-drawing or hot-drawing said thread to 4–10 times its length and, if necessary, subjecting it to heat treatment to improve its physical properties and obtain a more practically useful fiber. However, processes and apparata for after-treatment of two-dimensional molded articles in a way comparable to that of said artificial fiber thread can be said to still be in an undeveloped state.

Because extruded fiber is a linear article, its molecular orientation and, thereby, its physical properties can be effected by linear stretching, but in the case of 2-dimensional molded articles like film, plates, pipes, etc., any improvement in molecular orientation and physical properties can be effected only by stretching in both dimensions—that is, in both longitudinal and transverse directions. Though this theory has been known from prior art, up to now no industrially practicable method or apparatus that improves molecular orientation on a 2-dimensional surface uniformly has been put to use. In the blow extrusion molding method hitherto well known in the art, 2-dimensional stretching seems to have been added, but, in fact, as will be explained hereunder, it does not obtain a 2-dimensional stretching effect comparable to that obtained by the method of this application. More exactly, in the conventional well known blow extrusion method, the molecules of the inflated or blown part are in a liquid state macromolecularly against the molding speed. In other words, said inflated or blown parts are shaped like soap bubbles, and thereafter cooled and coagulated. Accordingly, though there is, of course, some 2-dimensional improvement, depending upon the relationship between molding speed and viscosity, the improvement in molecular orientation does not compare to that achieved in the case of after-stretching of fiber. The reason for this is though to be that in the blowing or inflation extrusion method the molecules to be blown or inflated must always be in a liquid state when the molecules are observed macromolecularly and as a matter of course micromolecularly, but they must be at least in a solid state when observed macromolecularly, in order to achieve sufficient stretching. The state in which the molecules are in liquid state observed micromolecularly and in solid state observed macromolecularly means a softened state of the molded article, and the after-stretching tension or pressure required is much greater as compared with that required in primary blowing or inflating material in prior art as in the after-stretching of synthetic fiber, and this high tension seems to effect breakage of continuous molding when said tension propagates to primary molding process, while the extruded polymer is in liquid state macromolecularly. In the case of fiber, the fiber is spun and wound in the primary process and then after-stretched in a secondary process; or, as an alternative, a device is used which prevents after-stretching tension from influencing the freshly spun coagulated fiber, thereby enabling spinning and after-stretching to be effected consecutively and continuously.

The invention of this application relates to a method and apparatus which, by after-stretching in two dimensions, attains the same result as the above-mentioned after-stretching of fiber in one dimension. The significance of the 2-dimensional stretching achieved by the invention of this application with respect to molded articles corresponds to that in the after-stretching of coagulated fiber in the manufacture of artificial fibers. More particularly, this invention relates to a method and apparatus for making it technically practicable to perform 2-dimensional stretching by re-heating and softening in the after-treatment process of the primary cylindrical molded article obtained by extruding a heated and molten polymer or concentrated polymer to which has been added a small amount of solvent or plasticizer by a hitherto well known method, and simultaneously inflating or expanding said primary cylindrical molded article by supplying high internal fluid pressure thereto. In more detail the gist of this invention lies in performing continuous 2-dimensional stretching in the after-treatment process by feeding fluid under pressure into the cylindrical molded article which has been heated and softened, and the invention of this application solves such problems as how to maintain the pressure of a pressurized fluid, how to determine the longitudinal and transverse stretch ratio of cylindrical molded articles, etc.

The way in which this invention is applied may differ to some extent depending upon whether the cylindrical molded article is to have a thin easily folded wall as in film or a thick hard-to-fold wall, as in plate and pipe. In any case, however, the characteristic feature of the method of this invention remains; namely, the cylindrical molded article floats along on the fluid during the process of stretching and frictional stretching resulting from contact with the solid wall surface is reduced to a minimum. This feature makes continuous high speed molding possible and, also, has the additional advantage that the molded article obtained is excellent in strength, elongation and other phsyical properties.

Figure 2:
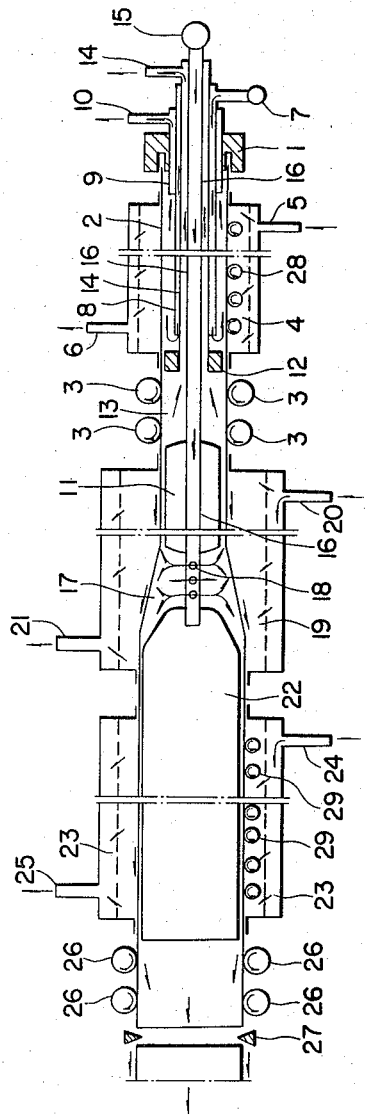
Figure 3A:
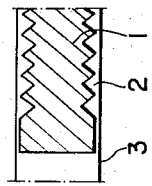
Figure 3B:
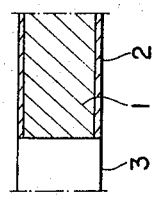

In order that the construction and operation of the invention of this application can be understood in detail, reference is made to FIG. 1, a cross sectional view of an apparatus which effects continuous 2-dimensional stretching by injecting a fluid into a cylinder at the point where a thin-walled cylindrical molded article has been softened. FIG. 2 is a cross sectional view of an apparatus which performs continuous 2-dimensional stretching of a thick-walled cylindrical molded article, like a plate or pipe, by applying fluid under pressure to the point which has been softened. FIGS. 3a and 3b show part of an apparatus that adjusts the length of a cylindrical plug contacting the inside wall of the molded cylindrical article which is used for maintaining the pressure of the pressurized fluid used for stretching.

In FIG. 1 is shown the type of apparatus used in working a 2-dimensional thin-walled molded article of cylindrical shape or a thin film which is to be folded double. Film wound on a roll in the primary stage of a thin-walled cylinder or tube made by blowing and subjecting to after-treatment such as extraction drying by use of a volatile solvent is used as the "original film 1." Said original film is folded and, with or without preheating to the softening point, sent forward or downward by means of first pinch rollers 2. The pressurized fluid to be used for stretching is prevented from leaking out the sides of the pinch rollers. Then, if the original film is to be inflated once more into cylindrical shape, it is heated by hot air or steam up to a temperature suitable for stretching by passing it through heating tank 3 or a radiator. If the molded article is a thin layer, a film, the pressure of the stretching fluid is as low as 0.1–0.2 kg./cm.$^2$, so in such case pressurized steam can be used as the pressure fluid.

For example, heat-softened cylindrical film 4 is stretched in two dimensions by inflating with pressurized hot air; immediately thereafter plug 5 is inserted therein so as to just touch the inner face of the stretched cylindrical film, the length of said plug being adjusted appropriately to insure that the stretched film runs forward and at the same time a thin layer of leaking gas is maintained between the face of the plug and the inner face of the cylindrical film, the stretching pressure being maintained by the resistance to leaking. After stretching, the cylindrical film is cooled and hardened by cold air spray 6 from outside as it moves forward along the outer circumference of the plug; thereafter, it is cut longitudinally into two semi-circular sheets by two cutters 7. Said semi-circular sheets of film then pass over a flat plate before reaching a second set of pinch rollers, 8 and 8', the speed of which determines the longitudinal stretching speed, and finally being wound up on rolls 9 and 9' at a predetermined speed.

The ratio between the diameter of the original film and that of the cylindrical plug determines the stretching ratio diametrically—that is, in the transverse direction, and the ratio between the circumferential speed of the two sets of pinch rollers, 2–2' and 8–8', is the stretch ratio in the longitudinal direction. Piping 10 for the pressurized fluid used for stretching and supporting frame 11 for plug 5 are inserted and supported from the side at the point where the cylindrical shaped film is cut off. Pressurized hot air used for 2-dimensional stretching passes from pump 12 through pipe 10 into pressurized air chamber 4 at the head of the plug.

In the apparatus of this invention the stretch ratio in the transverse direction of the cylindrical film is adjusted by selecting a suitable diameter for plug 5. This results from the fact that if the stretch ratio in the transverse direction of the cylindrical film becomes too great as the result of the constant and uniform fluid pressure, the clearance between the plug and the inner face of the surrounded cylindrical film becomes greater and the amount of fluid leaked increases, the result being that pressure in the fluid reservoir is lowered and, accordingly, the stretch ratio becomes smaller in the transverse direction; accordingly, the stretch ratio is self controlled. Also, if the stretch ratio in transverse direction decreases and the clearance between the stretching film and plug 5 becomes smaller, the quantity of fluid leaking into and flowing therebetween decreases and the pressure in the stretching chamber is gradually raised, thereby effecting a self-controlling action so as to increase the stretch ratio of the film in a transverse direction. Accordingly, if the diameter of the plug and the amount of pressure fluid supplied are properly adjusted, the stretch ratio in transverse direction is automatically adjusted and the film being stretched is not subjected to shearing force on the wall surface, since the film being stretched continues to float in the same direction as the flow of the leaked fluid, thus making it possible to perform high speed stretching of the film by fluid pressure smoothly.

The stretch ratio of the film is expressed as a product obtained by multiplying the longitudinal stretch ratio by the transverse stretch ratio, so good molecular orientation in a longitudinal direction or good molecular orientation in a transverse direction can be obtained by selecting an appropriate combination of the longitudinal and transverse stretch ratios even though in case the product of both ratios are of a fixed value.

The pinch rollers in this apparatus can fold primary molded cylindrical film less than 0.2 mm. and, in many cases, less than 0.1 mm. in thickness, and said film, after 2-dimensional stretching, will range from 0.01–0.02 mm. in thickness.

For example, cylindrical film 0.07 mm. thick, made by the blow extrusion method and using vinyl chloride with 8% plasticizer added as raw material, can easily be stretched twice its length and twice its width—that is, to 4 times its original area—by heating with hot air at 110° C. under pressure of 0.1 kg./cm.$^2$. This 2-dimensionally stretched film has a very brilliant metallic luster and, because of the improvement in molecular orientation, it has greater tensile strength, impact resistance, etc. than the conventional non 2-dimensional stretched film of the prior art, and, even though only a small amount of plasticizer is used or no plasticizer is used, it has greater flexibility and less plastic deformation and greater dimensional stability. Lastly, when the film is subjected to heat treatment it shows improvement in heat resistance.

The flexibility of film is greatly increased after stretching by the 2-dimensional stretching process of the invention of this application, even though only a little plasticizer or even no plasticizer is added, such as in fiber, and the molded product will be flexible, not brittle, and will be suitable for practical used. For example, volatile solvent is added to the raw resin material so as to make resin material sufficiently dissolved and extruded to obtain a primary molded article of good quality. Thereafter, the volatile solvent is extracted and then the molded article is heated and 2-dimensionally stretched by the apparatus shown in FIG. 1. In this case, the stretch ratio of the finished product is increased 5–8 times and a stretched film of good quality is obtained like in the case of fiber.

Also, it is possible to produce white paper of high dimensional stability by using the apparatus of FIG. 1 to 2-dimensionally stretch cylindrical film of white color which is made of a non-plastic material or a low-plastic material having foam structure.

FIG. 2 shows an apparatus suitable for 2-dimensional after-stretching of thick-layered or thick-walled molded articles like pipe as well as suitable for thin film. The first set of pinch rollers, which determines the primary molding speed, only moves the molded article forward; it does not reduce or cut off the fluid pressure operating for 2-dimensional stretching of the cylindrical molded article, because the article is not folded. In this case after primary molding, a first cylindrical plug of appropriate length is inserted at the rear position of said first pinch rollers into the cylindrical molded article so that it almost touches the inner face of said molded article, leaving only very small clearance between the outer face of the plug and the inner face of the molded article, thus creating great resistance against the flow of the pressure fluid in a direction opposite to that in which the primary molded article is moving, said resistance making it possible to maintain fluid pressure high enough to effect 2-dimensional stretching of the molded article. A second cylindrical plug of appropriate length is inserted in the same way within the rear part of said molded article, thereby creating resistance against the flow of pressure fluid leaking in that direction. The molded article, after passing through the second set of pinch rollers, is cooled and cut to make the finished product.

In this case, the ratio between the circumferential speed of the two sets of pinch rollers determines the stretch ratio in a longitudinal direction and the ratio between the diameters of the two cylindrical plugs determines the stretch ratio in a transverse direction and the product of the two ratios gives the area stretch ratio.

In order to reduce the time required for setting and softening of thick articles, a liquid is often used for cooling and heating of the molded articles. The stretching pressure required increases in proportion to the thickness of the article to be 2-dimensionally stretched, sometimes reaching a pressure of several atmospheres, so use of a liquid as the stretch-pressure fluid is preferable to make it easier to seal.

Usually the stretching apparatus of vertical type shown in FIG. 1 is more convenient to use, but sometimes a horizontal type, as shown in FIG. 2, is more convenient.

In FIG. 2 the primary molded cylindrical article 2 is cooled and set after being extruded out of extrusion die 1 and is then sent forward, at a predetermined speed, through several sets of concave pinch rollers 3. The primary molded article is cooled and set by cooling fluid which flows from pipe 5, which is enclosed in cooling tank 4, through pipe 6 and, according to need, is circulated by pump 7 through pipe 8 which passes through the extrusion head, thereby cooling the molded article from the inside, the warmed fluid being exhausted through pipe 9, which passes through the extrusion head, and then through pipe 10 which is connected to pipe 9. A first cylindrical plug 11 is inserted at the rear part of said pinch rollers 3 almost in contact with the inner face of the primary molded article, the length of said plug being adjusted appropriately to insure that resistance is created to counter the pressure fluid tending to leak out in the direction opposite to that of the molded article. Pressure fluid is prevented from leaking out toward the extrusion head by a resistance wall 12 provided almost in contact with the inside wall of the cylindrical molded article and pressure fluid that accumulates in clearance 13 is discharged through pipe 14 which passes through the extrusion head back through a pipe which pierces the pipe 8; and the pressure fluid is prevented from touching the metal extrusion die. Next, the heating liquid for 2-dimensional stretching is pumped in from holes 18 which open into stretching chamber 17 through pipe 16, which communicates with a pump 15, and, at the same time, the molded cylindrical article passes through heating tank 19. Heating liquid from pipe 20 circulates within the tank, heating and softening the molded article from the outside, and then said heating liquid is discharged through exhausted pipe 21. In the process where the molded article is inflated and stretched by heated pressure liquid and then moved forward, a second cylindrical plug 22 of appropriate length is inserted within the article so as to give a minimum of clearance between the inner face of said article and the outer face of said plug, thereby effecting maximum resistance to the pressure fluid tending to leak out with the result that there is no lowering of pressure due to leakage of pressure fluid and suitable working pressure is maintained. In this case the second plug is inserted in the rear part of the molded article and it moves through cooling tank 23 and cooling is effected by cooling water from pipe 24 which circulates throughout the tank and is discharged through pipe 25. Afte rcooling the molded set article moves forward at a predetermined speed by several sets of concave pinch rollers 26. As the stretch ratio in a longitudinal direction is determined by the ratio between the circumferential speed of the first and second sets of rollers and the stretch ratio in a transverse direction is determined by the ratio of the diameters of the two plugs, the area stretch ratio being the product of the foregoing two ratios. The self-controlling action of the stretch ratio in a transverse direction is based on the same principle as explained with respect to FIG. 1. Pipes of a predetermined length can be obtained by cutting the 2-dimensionally stretch cylindrically molded article after it has passed through the second set of pinch rollers. Plates of a thickness slightly less than pipe-wall thickness can be obtained by cutting the pipe into two semi-circular sheets with a cutter as in FIG. 1, flattening said semi-circular sheets, then cutting them to a predetermined length as they pass forward from out of said pinching rollers.

In case this long apparatus is intalled horizontally, as shown in FIG. 2, a thick-walled cylindrical molded article is supported by several concave rollers 28 as it comes out the extrusion head and is lead through the cooling tank 4 and, again as it passes through cooling tank 23 is supported by several concave rollers 29 and also supported by the first and second sets of pinch rollers. The two plugs for adjusting fluid pressure are supported from the extrusion head end by the piping which goes through the first plug and supplies pressure fluid between two plugs, but the other end, is unsupported. However, in this invention the two plugs are hollow to give them buoyancy in the pressure fluid and the unsupported end is actually supported by the pressure fluid, the buoyancy of the plugs being adjusted so that it is approximately equal to the combined weight of the two plugs plus piping. The flow of the pressure fluid during operation is almost evenly distributed throughout the clearance between the outer circumference of the plugs and the inner wall of the article, thus insuring that operations are carried out smoothly. This method, and the apparatus in FIG. 2 which incorporates it, reflect one of the characteristics of this invention; that is, by using the piping by the side of the extrusion head to support the two cylindrical plugs, thereby restricting the leakage of the pressure fluid used for 2-dimensional stretching, it is possible, after completing the 2-dimensional stretching, to take the article out in cylindrical form. Accordingly, in case this apparatus is installed in vertical position, if the article is in a thin film-like layer or has a thin wall which is easily and quickly cooled or heated by air, the overall length of the apparatus can be made short and the load on the extrusion small; therefore, vertical installation of the apparatus is convenient for practical use. In other words, air used for expanding the article, which has leaked out to accumulate between the second cylindrical plug and the second pinch rollers positioned at the rear side of said second plug, said second pinch rollers, in this case, pinching the thin-walled article air-tight to prevent the air against leaking out beyond the second pinch rollers, is exhausted through an exhaust pipe provided coaxially within the inside of the pipe passing through the center of the two plugs for supplying air for stretching.

In shaping thick-walled cylindrical articles the pressure of the pressure fluid used for 2-dimensional stretching varies, sometimes becoming very high, depending upon the thickness of the molded article and, accordingly, the length of the cylindrical plugs used for maintaining stretching pressure must be varied, in turn, depending upon the pressure required. However, shorter plugs can be used if the structure shown in FIGS. 3-A and 3-B are used. In FIG. 3-A is shown a structure with grooves 2 provided transversely to the plug axis around the outer circumference of the plug; that is, at right angles to the direction of flow of the leaking fluid. In FIG. 3-B is shown a cylindrical plug 1 around which a thin layer of porous material has been firmly plastered. Either of these two methods increases resistance to the flow of the leaking pressure fluid in the clearance between the outer face of the plug and the inner face of cylindrical article 2 and, accordingly, the use of shorter plugs is practicable.

A two-dimensional article that has been two-dimentionally stretched by the method of this invention tends to shrink when heated, if it has not been subjected to thermosetting. Of course, in some cases this tendency to shrink can be utilized, but in many cases—paper, plate, pipe, etc.—resistance to heat as well as dimensional stability are required, and in these cases, as in the case of synthetic fiber, heat treatment is applied. As in the case of synthetic fiber, the method of thermosetting after stretching, the appropriate degrees of temperature, length of time heat is applied, etc. depend upon the type of polymer used in the molded article. If the article is in a thin layer, like film or paper, thermosetting can be effected continuously by contacting it with heated rollers. In the case of thick plate thermosetting can be effected by using a heating press after the plate has been cut into the desired length. The thermosetting of molded pipe can be effected by inserting a metal pipe of the desired diameter within a molded stretched pipe of the desired length, the diameter of which is just a little larger than that of the metal pipe. When the metal pipe is heated to an appropriate temperature for appropriate time in the heat-treatment chamber, the molded stretched pipe shrinks and hugs the metal pipe within. Before cooling the molded pipe so treated is taken out of the heat-treatment chamber, still sticking to the metal pipe, and is inflated, like the inner tube of a bicycle which has been vulcanized on a metal pipe, and then it is drawn off the metal pipe. The inside diameter of the molded stretched pipe thus obtained is determined by the outside diameter of the metal pipe and after such heat treatment strong, heat resistant, highly stabilized pipe of synthetic resin is obtained.

Two methods are used in the heat treatment of synthetic fiber. In one the length is held constant, in the other, the so-called "relax heat treatment," a contraction of 20–25% in length is effected. Both methods can be applied to molded articles and, as with synthetic fiber, the "relax heat treatment" effects a more complete elimination of shaping strain and gives a finished article of higher stability.

This invention can be applied to any linear high molecular compounds, said compounds being thermoplastic or having been made thermoplastic by the addition of plasticizer, then molded to cylindrical shape. For example, polyamide, polyester, polystyrene, polyethylene, polypropylene, polycarbonate, etc. are molten by heating without plasticizer or with the addition of a small amount of solvent, molded to obtain the primary molded article, then stretched in two dimensions by fluid pressure or cold drawing immediately after said primary molding. Because polyvinyl chloride, polyvinylidine, polyacrylonitril or copolymers of these series are liable to be decomposed by temperatures near their melting points, the primary molding of these articles is usually effected with the addition of solvent or plasticizer; the solvent is extracted after the primary molding, and then the article is heat stretched while the article still retains a little moisture or plasticizer. Cylindrically molded primary film made of polyvinyl alcohol, polyacrylonitril, cellulose acetate, as well as regenerated cellulose film, etc., just after setting by the viscose process, can be heat-stretched when containing some moisture. In case of these materials it is also possible to effect two-dimensional stretching of the primary molded article by applying steam under pressure to the article from the inside while heating it by steam from the outside.

What is claimed is:

1. A device for increasing the strength and impact resistance of thermoplastic tubular film which has been previously produced by extrusion comprising: first pinch roller means controlling the forward speed of said film and substantially preventing fluid inside of the tubular film from leaking past said first pinch rollers, cylindrical mandrel means spaced from said pinch roller means, and having an outer diameter greater than the inside diameter of the film passing thereover, means to inject a heated fluid under pressure inside said tubular film at a point intermediate said first pinch roller means and said mandrel means thereby to heat, soften, stretch and bulge the film, said fluid confined within the tubular film flowing outwardly to the atmosphere through an annulus formed between the periphery of the mandrel means and the inside surface of the tubular film, said mandrel means having a diameter and adequate length sized with respect to the fluid pressure within the annulus to provide a fluid pressure drop sufficient to maintain a cushion of fluid between the film and the mandrel means and keep them substantially out of contact, means to cool and harden the hot stretched film, cutting means to longitudinally cut the hardened film into two portions, two second pinch roller means, one for contacting each of said portions and having a faster peripheral speed than said first pinch roller means thereby to longitudinally stretch the film, and take up roller means upon which to wind the film portions.

2. A device for increasing the strength and impact resistance of thermoplastic tubular film which has been previously produced by extrusion comprising: first pinch roller means contacting the outer surface of the film which controls the forward speed thereof, cylindrical plug means within the tubular film having an outer diameter corresponding substantially to the inside diameter of the tubular film, cylindrical mandrel means spaced from said plug means, having an outer diameter greater than the inside diameter of the film passing thereover, means to force a heated fluid under pressure inside said tubular film at a point intermediate said plug means and said mandrel means thereby to heat, soften, stretch and bulge the film, said fluid confined within the tubular film flowing outwardly to the atmosphere through an annulus formed between the periphery of the mandrel means and the inside wall of the film, said mandrel means having a diameter and adequate length sized with respect to the fluid pressure within the annulus to provide a fluid pressure drop therein sufficient to maintain a cushion of fluid between the film and the mandrel and keep them substantially out of contact, means to cool and harden the hot stretched film, and second pinch roller means contacting the outer surface of the cooled film and having a faster peripheral speed than said first pinch roller means thereby to longitudinally stretch the film.

3. A method of biaxially after-stretching a length of thin tubular film previously extruded from thermoplastic resin, the steps comprising; passing said film through first pinch rolls which control the forward speed thereof and substantially prevent fluid inside of the tubular film from leaking past said first rolls, passing the tubular film about the periphery of a cylindrical mandrel spaced from said first pinch rolls which mandrel has an outer diameter greater than the inside diameter of the tubular film, forcing a heated fluid under pressure inside the tubular film at a point intermediate said first pinch rolls and said mandrel thereby to heat, soften, stretch and bulge the film, said fluid confined within the tubular film flowing outwardly to the atmosphere through an annulus formed between the periphery of the mandrel and the inside wall of the stretched film, said mandrel having a diameter and adequate length sized with respect to the fluid pressure within the annulus to provide a fluid pressure drop therein sufficient to maintain a cushion of fluid between the film and the surface of the mandrel and keep them substantially out of contact, cooling and hardening the hot-stretched film, longitudinally cutting the hardened film into two portions, passing each of the resulting film portions through second pinch rolls having a faster peripheral speed than said first pinch rolls thereby to longitudinally stretch the film, and winding said stretched film portions on separate take up rolls.

4. The method of claim 3 further comprising the step of subjecting the outer surface of the film while it is being bulged, to a hot gas to heat-soften the outer surface thereof.

5. The method of claim 3 wherein the heated fluid under pressure is steam.

6. A method of biaxially after-stretching a length of thin tubular film previously extruded from thermoplastic resin, the steps comprising; passing said film through first pinch rolls which control the forward speed thereof, passing the tubular film about the periphery of a cylindrical plug having an outer diameter substantially corresponding to the inside diameter of the tubular film, passing the tubular film about the periphery of a cylindrical mandrel spaced from said cylindrical plug, which mandrel has an outer diameter greater than the inside diameter of the film, forcing a heated fluid under pressure inside said tubular film at a point intermediate said cylindrical plug and said mandrel thereby to heat, soften, stretch and bulge the film, said fluid confined within the tubular film flowing outwardly to the atmosphere through an annulus formed between the periphery of the mandrel and the inside wall of the film, said mandrel having a diameter and adequate length sized with respect to the fluid pressure within the annulus to provide a fluid pressure drop therein sufficient to maintain a cushion of fluid between the film and the mandrel and keep them substantially out of contact, cooling and hardening the hot-stretched film, longitudinally cutting the hardened film into two portions, passing each of the resulting film portions through second pinch rolls having a faster periphery speed than said first pinch rolls thereby to longitudinally stretch the film, and winding said film portions on separate take up rolls.

7. The method of claim 6 wherein the heated fluid under pressure is steam.

8. The method of claim 6 wherein the hot-stretched film is cooled with a fluid in contact with the outer surface thereof when it is passing over the mandrel.

References Cited by the Examiner

UNITED STATES PATENTS

| | | | |
|---|---|---|---|
| 2,668,323 | 2/1954 | Johnson | 18—14 |
| 2,862,234 | 12/1958 | Gerber | 264—95 |
| 2,863,172 | 12/1958 | Buteux et al. | 18—14 |
| 2,966,700 | 1/1961 | Dyer | 18—14 |
| 2,979,777 | 4/1961 | Goldman. | |
| 2,987,765 | 5/1961 | Cichelli | 264—95 |
| 3,085,293 | 4/1963 | Kritchever | 264—210 |
| 3,090,991 | 5/1963 | Hathaway | 264—290 |
| 3,090,998 | 5/1963 | Heisterkamp et al. | 264—290 |
| 3,092,874 | 6/1963 | Fallwell | 264—95 |
| 3,193,547 | 7/1965 | Schott | 264—95 |

FOREIGN PATENTS

| | | |
|---|---|---|
| 812,387 | 4/1959 | Great Britain. |
| 1,226,472 | 7/1960 | France. |

ALEXANDER H. BRODMERKEL, *Primary Examiner.*

F. S. WHISENHUNT, A. H. KOECKERT,
*Assistant Examiners.*